United States Patent
Entwistle

(10) Patent No.: US 6,782,551 B1
(45) Date of Patent: Aug. 24, 2004

(54) SYSTEM FOR INDICATING WHEN A PROGRAM HAS BEEN SELECTED FROM A PROGRAM GUIDE DISPLAY

(75) Inventor: Paul Entwistle, Shipley (GB)

(73) Assignee: Pace Micro Technology PLC, Shipley (GB)

( * ) Notice: Subject to any disclaimer, the term of this patent is extended or adjusted under 35 U.S.C. 154(b) by 520 days.

(21) Appl. No.: 09/613,121

(22) Filed: Jul. 10, 2000

(30) Foreign Application Priority Data

Jul. 15, 1999 (GB) .............................................. 9916459

(51) Int. Cl.[7] .............................................. H04N 5/445
(52) U.S. Cl. .............................. 725/46; 725/47; 725/52; 725/58
(58) Field of Search .................... 725/9–11, 39–40, 725/44, 46, 53, 58, 45, 52, 47

(56) References Cited

U.S. PATENT DOCUMENTS

| | | | | | |
|---|---|---|---|---|---|
| 5,534,911 | A | * | 7/1996 | Levitan ........................ | 725/46 |
| 5,583,560 | A | * | 12/1996 | Florin et al. .................... | 725/40 |
| 5,589,892 | A | * | 12/1996 | Knee et al. ...................... | 725/43 |
| 5,699,107 | A | * | 12/1997 | Lawler et al. .................. | 725/58 |
| 5,801,787 | A | * | 9/1998 | Schein et al. ................... | 725/43 |
| 5,812,123 | A | * | 9/1998 | Rowe et al. ..................... | 725/43 |
| 5,844,620 | A | * | 12/1998 | Coleman et al. .............. | 725/54 |
| 6,023,267 | A | * | 2/2000 | Chapuis et al. ............. | 345/810 |
| 6,122,011 | A | * | 9/2000 | Dias et al. ................... | 348/569 |
| 6,177,931 | B1 | * | 1/2001 | Alexander et al. ............. | 725/52 |
| 6,256,019 | B1 | * | 7/2001 | Allport ........................ | 345/169 |
| 6,396,544 | B1 | * | 5/2002 | Schindler et al. ........... | 348/461 |
| 2001/0025375 | A1 | * | 9/2001 | Ahmad et al. ................. | 725/39 |
| 2003/0154478 | A1 | * | 8/2003 | Hassell et al. ................. | 725/39 |

FOREIGN PATENT DOCUMENTS

| | | | |
|---|---|---|---|
| EP | 0 774866 A | 5/1997 | ............ H04N/5/44 |
| GB | 2289782 A | 11/1995 | ............ H04N/7/00 |
| WO | WO 97/48230 | 12/1997 | ............ H04N/7/00 |
| WO | WO 98/21878 | 5/1998 | |
| WO | WO 00/11869 | 3/2000 | ............ H04N/7/16 |
| WO | WO 00/27122 | 5/2000 | .......... H04N/7/173 |

* cited by examiner

*Primary Examiner*—John Miller
*Assistant Examiner*—Johnny Ma
(74) *Attorney, Agent, or Firm*—Head, Johnson & Kachigian

(57) ABSTRACT

The invention to which this application relates is a television system which allows a visual or other form of indication to be generated to a user of the system that a programme which they select to watch has previously been viewed by them and is therefore a repeat showing of the programme. This prevents the user from having to try and guess whether they have previously viewed the programme before selecting the programme from, for example, an Electronic programme Guide (EPG). The system includes a database in which information for those programmes which are selected by the user to view is input and in which the information is stored for a period of time period thereafter to allow comparison with data for programmes which are subsequently selected to be viewed by the user.

14 Claims, 1 Drawing Sheet

Figure 1A
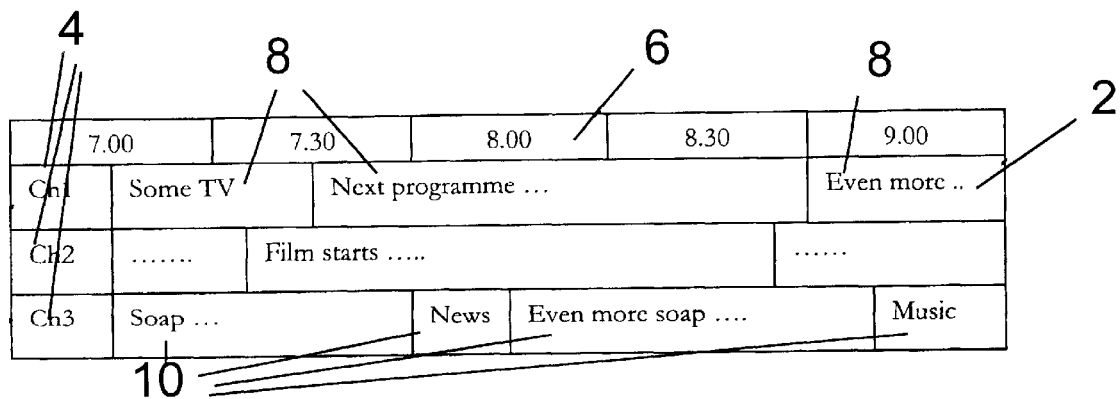
Figure 1B
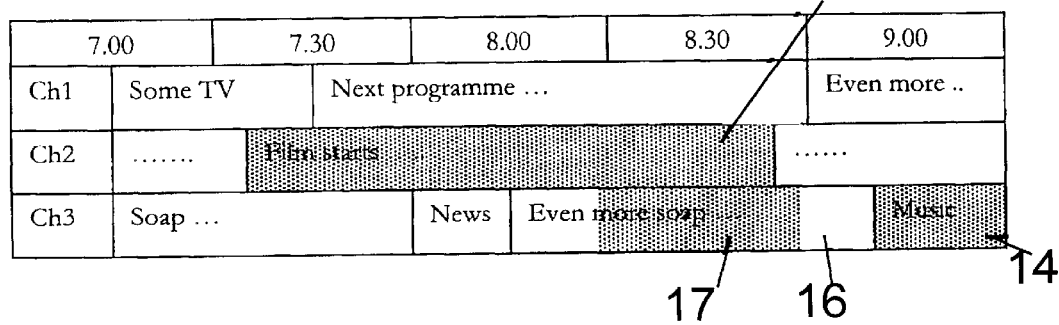
Figure 2A
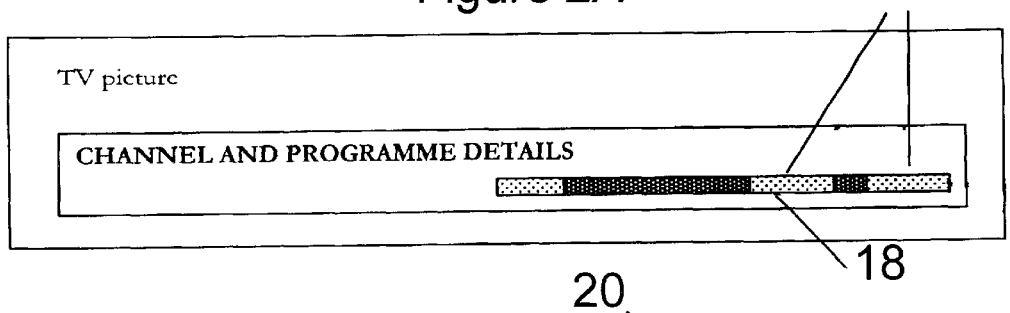
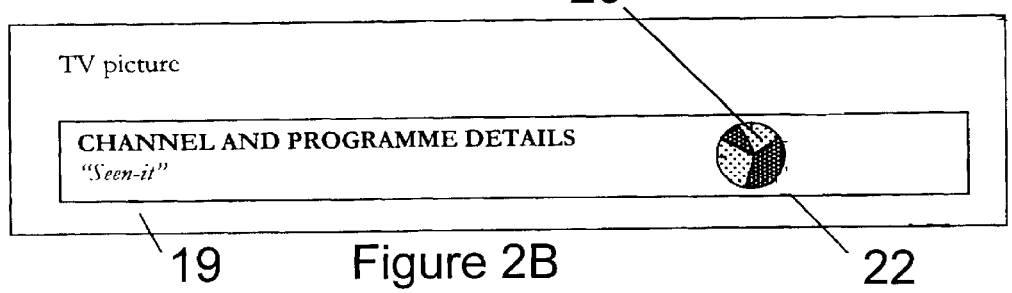
Figure 2B

SYSTEM FOR INDICATING WHEN A PROGRAM HAS BEEN SELECTED FROM A PROGRAM GUIDE DISPLAY

CROSS-REFERENCE TO RELATED APPLICATIONS

This application claims priority to GB Application No. 9916459.2 filed Jul. 15, 1999.

The invention to which this application relates is to provide an improvement in the function and utility of a television system in a manner to improve the use of the system. One particular but not exclusive use is with reference to what is known as an Electronic Program Guide.

An electronic programme Guide (EPG) is provided to the user of a television system to display programme schedules and also provide additional information about selected programmes, and the presentation of the information in particular forms and groups which can be selected and controlled by the user. The EPG is displayed on a television screen or monitor and is compiled from data received by a broadcast data receiver connected to the screen. The EPG data is typically broadcast as part of the broadcast data which is used to generate the video and audio displays for the programmes.

With the development of digital television in the form of satellite, cable and terrestrial broadcast systems, the proliferation of television channels which can be selected to be viewed has been dramatic and as a result the only practical way in which to provide details of the programmes available to be watched is to provide the information in an EPG format on screen which, at least initially, normally comprises a grid which indicates at least some of the channels which are available, a time bar representing a time period and an indication of the programmes which are available to be watched on the displayed channels within the time period.

A result of the proliferation of television channels is that many broadcasters now repeat the programmes a number of times over a relatively short period of time of say a day, week or month. The reasons for this can be to allow the viewing of the programme by as many interested users as possible given that if a person cannot watch the programme at a particular time of display they should be free to watch one of the repeat showings of the same.

While it is found that the repeat showings of programmes can be of advantage it can act as an irritant to viewers who find that they are watching a repeat of a recently shown programme which they have already watched or, if using the EPG, a programme which is displayed on screen for the particular time period may be a repeat of a programme already viewed and which is being repeated in the time period of the EPG which is displayed at the instant. In the use of the EPG the irritation is caused by the fact that the user has to check or look through all the programmes on the EPG display and then find that they have already viewed some of them and this wastes time and can cause confusion to the viewer.

BACKGROUND OF THE INVENTION

The aim of the present invention is to provide an improvement to a television system whereby programmes which have already been viewed by a user and which are subsequently repeated are indicated such as by an indication on the screen or on the EPG thereby indicating to the viewer the repeat of a previously watched programme which they can then decide relatively quickly to disregard.

In a first aspect of the invention there is provided a television system for displaying a selected programme from a plurality of programmes available to be viewed by a user of the system, said system comprising a broadcast data receiver for receiving broadcast video, audio and auxiliary data and generating video on a screen from the data, a means for the user selection of programmes to be viewed and characterised in that the system further includes a database in which information relating to those programmes which have been selected to be viewed by the user, is stored.

In one embodiment the database stores information identifying the programmes selected for viewing by the user and if any of the programmes subsequently selected to be viewed by the user are already identified in the database this is indicated to the user. In one form the indication is provided by an on screen display such as a text message or icon.

In an alternative embodiment the indication to the user is provided via an Electronic programme Guide (EPG) display which is selectively generated on screen and which displays to the user a number of programmes available to be selected to be watched and those programmes which have previously been selected for viewing by the user are indicated as such by a visual indication.

In one embodiment of the invention the EPG display comprises a time bar indicative of a time period, and a series of channels for which programmes are displayed in a grid containing a number of cells, each cell representing a programme available to be viewed within the time period indicated. In accordance with the invention those cells which represent programmes which are repeated and have already been viewed by the user are differentiated, typically visually, to the user. The means for differentiating can be any of shading, change in colour, the generation of a message or icon or the like.

The database can be provided to hold information relating to programmes which have been selected to be viewed during a preceding designated time period such as a week or a month. In one embodiment the database can be provided to indicate whether the whole or part of a programme has already been watched and, if only part of the programme has been previously watched, indicate this to the user.

One means of implementing the invention is for the broadcaster of the data to broadcast a unique identification code, or the broadcast data receiver generates a unique identification code, for each programme, which code is identified by the broadcast data receiver and the codes for those programmes which have been selected to be watched are input into the database.

Thus, when the user selects to watch a programme or a programme is displayed on an EPG the code for the programme is compared with those held in the database and if there is a match a message is generated to the user to indicate that they have already watched the programme. If an EPG is to be generated, the codes for the programmes which are to be displayed in the EPG are checked against those in the database and, if there is a match, the display for the particular programmes is changed on the EPG to differentiate the same.

In one embodiment the broadcaster may only send identifying codes for those programmes which are to be repeated within a certain time period so that if the programme has no code it is ignored by the system whether or not it is watched by the user and it is only if the programme has a code that the same is stored in the database if the user selects to watch it.

In an alternative embodiment if the user selects a programme from the EPG a search is undertake of the EPG data to ascertain whether that programme is to be repeated. If so the user can have the option of inputting a signal so that the subsequent repeat showings of the programme are differentiated on the EPG. This embodiment would mean that the broadcaster need not forward signals and that the user can control the display to indicate the repeat showings.

In a further feature of the invention, and especially where the system is being used by a number of persons, each person may not have seen a previously watched programme so that one or some of the persons may wish to watch the repeat showing. In this instance the differentiation of, for example, the EPG is of value as it indicates when the repeat is shown and in this embodiment a personal viewing profile is generated so that the subsequent differentiation on the EPG or message on screen to indicate that the programme has already been watched will also indicate the person or persons who previously watched the programme. It is envisaged that some form of code can be input by the user before selecting programmes to watch.

SUMMARY OF THE INVENTION

A specific embodiment of the invention is now described with reference to the accompanying drawings wherein;

BRIEF DESCRIPTION OF THE DRAWINGS

FIGS. 1A and B illustrated on one embodiment of the invention in use with an Electronic Programme Guide; and FIGS. 2A and B illustrate alternative embodiments of the invention to generate an on screen message. Referring now to FIG. 1A there is illustrated one form of an EPG display 2 which comprises rows of television channel information 4 and a time bar 6. Each row is split into cells 8 and each cell represents a programme 10 which can be selected to be watched. The start, end and length of the cells indicate, in conjunction with the time bar, the starting time, end time and length of the programmes respectively. This type of EPG display is updated and extended for different time periods as required by the user.

FIG. 1B illustrates the EPG display of FIG. 1A incorporating one embodiment of the current invention and indicates how there can be provided a visual indication to the user of a programme which they have already selected to view.

In this example, a film 12 is available to be watched on Ch2 but is shaded. This indicates to the viewer that the film has already been broadcast at an earlier time, perhaps over a preceding designated time period, and has been selected previously by the user for viewing. Thus the user can, if they wish, disregard this and other similarly shaded programmes on the EPG such as the music programme 14 on Channel 3. Also shown, on Ch 3, is that the programme "even more soap" 16 has been previously seen but the area of shading 17 indicates that not all of the programme has been previously viewed so that the user may select to watch the start of the programme and the end of the programme to view the parts which they missed.

The calculation of the time period during which the selected programme was previously watched can be made with reference to the information held in the database, typically in the broadcast data receiver, which can in this embodiment include an identification code for the programme provided by the broadcaster and an indication of the time period for which the programme was viewed at the first time of selection. The visual indication can then be generated as shown to mirror this information.

FIGS. 2A and B illustrate alternative forms of display which may be generated on screen to indicate to a user the status of programmes which have previously been seen over time such that the time bar or pie chart 18,20 respectively indicate portions 22 of the programmes on particular channels which have previously been seen.

A further alternative is shown in FIG. 2b, where independently of an EPG a message 19 is generated and displayed indicating that a selected programme has already been viewed. It is envisaged that the message is generated when the opening titles for the programme are shown on screen so as to alert the user to this fact and the user may then decide to change channels or switch off or ignore the message.

In each case the system utilises a database into which information is input for programmes when they have been selected to be watched by the user. The information is then stored for a given time period such as a month. In use in one embodiment the broadcaster can identify each programme by sending a flag or identification code with the data for each programme, and, when a programme is selected to be viewed the relevant flag or identification code are stored in the database. When subsequent programmes are selected to be viewed or an EPG is to be generated for a time period, the identification code or flags for the selected programme or programmes are compared with those held in the database. If there is a match or matches to indicate that the relevant programme or programmes has/have already been viewed by the user or users of that system, a message is generated for display on screen or the EPG is generated to include visual indications of those programmes which have already been viewed.

In one embodiment and to simplify the procedure the broadcaster provides indicators or flags which identify only those programmes which are to be repeated within a certain time period and the system need only refer and compare those programmes for which the flags or indicators are transmitted.

In a yet further embodiment if the user selects to view a programme from an on screen EPG display a search is undertake of the data held by the receiver for the generation of the EPG to check to see whether the selected programme is identified in the PEG display as being repeated. If so the user can select to generate a signal for display for all subsequent repeats of that programme to remind them of the fact that they have already viewed the said programme. As this embodiment refers to data for the generation of the EPG, the time period over which the analysis may be performed may be relatively small, say 24 hours, however it means that the broadcaster need not forward specific flags or indicators.

Typically the user can input selections and control whether or not to display the visual indication described via any suitable control means such as by using a conventional remote control device.

DETAILED DESCRIPTION OF THE PREFERRED EMBODIMENT

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element.

The invention provides for the improved use of EPG system and the television system as a whole to the user or users of the same.

What is claimed is:

1. A television system for displaying a selected program from
a plurality of programs available to be viewed by a user of the system, said system comprising:
a broadcast data receiver for receiving broadcast video, audio and auxiliary data and generating video on a screen from the data;
a means for the user selection of programs to be viewed;
a database in which information relating to those programs which have been selected to be viewed by the user is stored; and when a user selects to view a program from the Electronic Program Guide a search is undertaken of the Electronic Program Guide database to ascertain whether that program is to be repeated and, if so, the user has the option of inputting a signal so that the repeat program is differentiated on subsequent Electronic Program Guide displays.

2. A television system according to claim 1 wherein said database stores information identifying the programs which have been selected for viewing by the user and if any of the programs subsequently selected to be viewed by the user are already identified in said database this is indicated to the user.

3. A television system according to claim 2 wherein the indication is provided by an on screen display such as a text message or icon.

4. At television system according to claim 2 wherein a visual indication to the user is provided via an Electronic Program Guide display on screen and which displays to the user a number of programs available to be selected to be watched and those programs which have previously been selected for viewing by the user are indicated.

5. A television system according to claim 4 wherein the Electronic Program Guide display includes a time bar indicative of a time period, and a series of channels for which programs are displayed in a grid containing a number of cells, each cell representing a program available to be viewed within the time period indicated.

6. A television system according to claim 5 wherein those cells which represent programs which are repeated and have already been viewed by the user are visually differentiated from the other cells.

7. A television system according to claim 1 wherein said database holds information relating to viewed programs during a preceding designated time period.

8. A television system according to claim 1 wherein said database includes identification data for each program.

9. A television system according to claim 8 wherein said database includes an indication as to the duration of viewing of a previously viewed program.

10. A television system according to claim 1 wherein the broadcaster of said data broadcasts a unique identification code or said broadcast data receiver generates a unique identification code for each program, which code is identified by said broadcast data receiver and the codes for those programs which have been selected to be watched are input into said database.

11. A television system according to claim 10 wherein when a user selects to view a program the identification code for the program is compared with those held in said database and if there is a match a message is generated to the user to indicate that they have already watched the program.

12. A television system according to claim 10 wherein if an Electronic Program Guide is to be generated, the codes for the programs which are to be displayed in the Electronic Program Guide are checked against those in said database and, if there is a match, the display for the particular program or programs is changed on the Electronic Program Guide to differentiate the same.

13. A television system according to claim 10 wherein the broadcaster only sends identifying codes for those programs which it is known are to be repeated within a certain time period and those without identification codes are ignored.

14. A television system according to claim 1 wherein the system is used by a number of persons, each person being able to access a personal viewing profile so that the visual indication of a repeated program on screen indicates the person or persons who have previously watched the program.

* * * * *